United States Patent
Houtman et al.

(10) Patent No.: US 7,341,541 B2
(45) Date of Patent: Mar. 11, 2008

(54) METHOD TO REDUCE BACKLASH IN A DRIVE TRAIN

(75) Inventors: Steven T Houtman, South Lyon, MI (US); Jeffrey D Foor, Plymouth, MI (US); Joseph Roy, Southfield, MI (US); Michael A Dazy, Northville, MI (US); Mark Thompson, Windsor (CA); Louis Moncion, Oakland Township, MI (US)

(73) Assignee: Chrysler LLC, Auburn Hills, MI (US)

( * ) Notice: Subject to any disclaimer, the term of this patent is extended or adjusted under 35 U.S.C. 154(b) by 198 days.

(21) Appl. No.: 11/247,801

(22) Filed: Oct. 11, 2005

(65) Prior Publication Data

US 2007/0082787 A1    Apr. 12, 2007

(51) Int. Cl.
| | |
|---|---|
| *B60W 10/02* | (2006.01) |
| *B60W 10/04* | (2006.01) |
| *G06F 7/00* | (2006.01) |
| *G06F 17/00* | (2006.01) |
| *G06F 19/00* | (2006.01) |

(52) U.S. Cl. ............... 477/180; 477/174; 701/67; 701/69

(58) Field of Classification Search ............... 477/180; 701/67–69
See application file for complete search history.

(56) References Cited

U.S. PATENT DOCUMENTS

| | | | |
|---|---|---|---|
| 6,079,535 A | 6/2000 | Mueller et al. | |
| 6,615,126 B1 | 9/2003 | Potter et al. | |
| 6,722,482 B2 * | 4/2004 | Takuno et al. | 192/35 |
| 7,144,347 B2 * | 12/2006 | Kushino | 475/249 |
| 7,151,991 B2 * | 12/2006 | Iida | 701/69 |

* cited by examiner

*Primary Examiner*—Tisha Lewis
(74) *Attorney, Agent, or Firm*—Alexander Zelikov

(57) ABSTRACT

A method to reduce backlash in a drive train of a four-wheel drive vehicle, the method including receiving rotational parameters from sensors in the four-wheel drive vehicle, determining a torque reversal in the drive train based on the received rotational parameters and sending a command signal to initiate engagement of a clutch pack in a transfer case of the drive train responsive to the determination.

16 Claims, 5 Drawing Sheets

METHOD TO REDUCE BACKLASH IN A DRIVE TRAIN

FIELD OF THE INVENTION

This invention relates generally to vehicle drive trains. In particular, the invention relates to reducing backlash in the drive train of a four-wheel drive vehicle.

BACKGROUND OF THE INVENTION

Conventional part-time four-wheel drive vehicles are typically equipped with a drive train to transmit rotary power from the power train to a front pair of drive wheels and/or a rear pair of drive wheels. The front axle assembly is connected to a front driveshaft and the rear axle assembly is connected to the rear driveshaft. The gear teeth, splines or mechanical interfaces with the gear sets in the driveshaft mesh with the gear teeth, splines or mechanical interfaces of interfacing gear sets in the front and rear drive trains. There is a small amount of clearance between the gear teeth in the interfacing gears. Throughout this document, the phrase "teeth" refers to gear teeth, splines or mechanical interfaces in a gear set and the phrase "tooth" refers to a gear tooth, a spline or a mechanical interface in a drive train.

When the throttle level in the four-wheel drive vehicle changes or a transmission gear shift occurs, the torque on the driveshafts change. The torque change results in backlash at interfaces connecting different rotating components. The backlash occurs at the transfer case chain to sprocket interfaces, at the sprocket to driveshaft interfaces, at the driveshaft universal joints, at the driveshaft slip joints, and at the axle differential gear set to driveshaft interfaces. Specifically, the gear teeth in a gear on a first component impact the gear teeth in a gear on a second interfacing component when the angular velocity of the first component decreases or changes direction before the angular velocity of the second interfacing component has likewise changed.

The driver can experience the backlash as jolting vibration in the vehicle, which is typically called "clunk." In many cases, the clunk is audible to the driver. The intensity of the clunk is related to the number of backlash events, the relative timing of backlash events in the vehicle, and the amount of backlash in the system.

In a four-wheel drive vehicle, the front driveshaft and rear driveshaft can experience differing amounts of backlash. The amount of angular rotation change of the front driveshaft before impact with the meshed gear teeth in the interfacing front driveshaft components can be more or less than the amount of angular rotation change of the rear driveshaft before impact with the meshed gear teeth in the interfacing rear driveshaft components. Any difference in the amount of rotation change between the front driveshaft components and the rear driveshaft components extends the duration of the backlash-induced clunk experienced by a driver and passengers in the vehicle.

It is desirable to overcome these and other disadvantages when the angular velocity changes for the components of a drive train. It is further desirable to reduce the backlash in the drive train of a four-wheel drive vehicle.

SUMMARY OF THE INVENTION

Accordingly, a method is provided to reduce backlash in a drive train of a four-wheel drive vehicle. The method includes receiving rotational parameters from sensors in the four-wheel drive vehicle, determining a torque reversal in the drive train based on the received rotational parameters and sending a command signal to initiate engagement of a clutch pack in a transfer case of the drive train responsive to the determination.

A second aspect of the present invention provides a system to reduce backlash in a drive train of a four-wheel drive vehicle. The system includes sensors for receiving rotational parameters in the four-wheel drive vehicle, and a computer for determining a torque reversal in the drive train based on the received rotational parameters and for sending a command signal to initiate engagement of a clutch pack in a transfer case of the drive train responsive to the determination.

A third aspect of the present invention provides computer readable medium storing a computer program. The medium includes computer readable code for receiving rotational parameters from sensors in a four-wheel drive vehicle, for determining a torque reversal in a drive train of the four-wheel drive vehicle based on the received rotational parameters and for sending a command signal to initiate engagement of a clutch pack in a transfer case of the drive train responsive to the determination.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENTS

Figure 1:
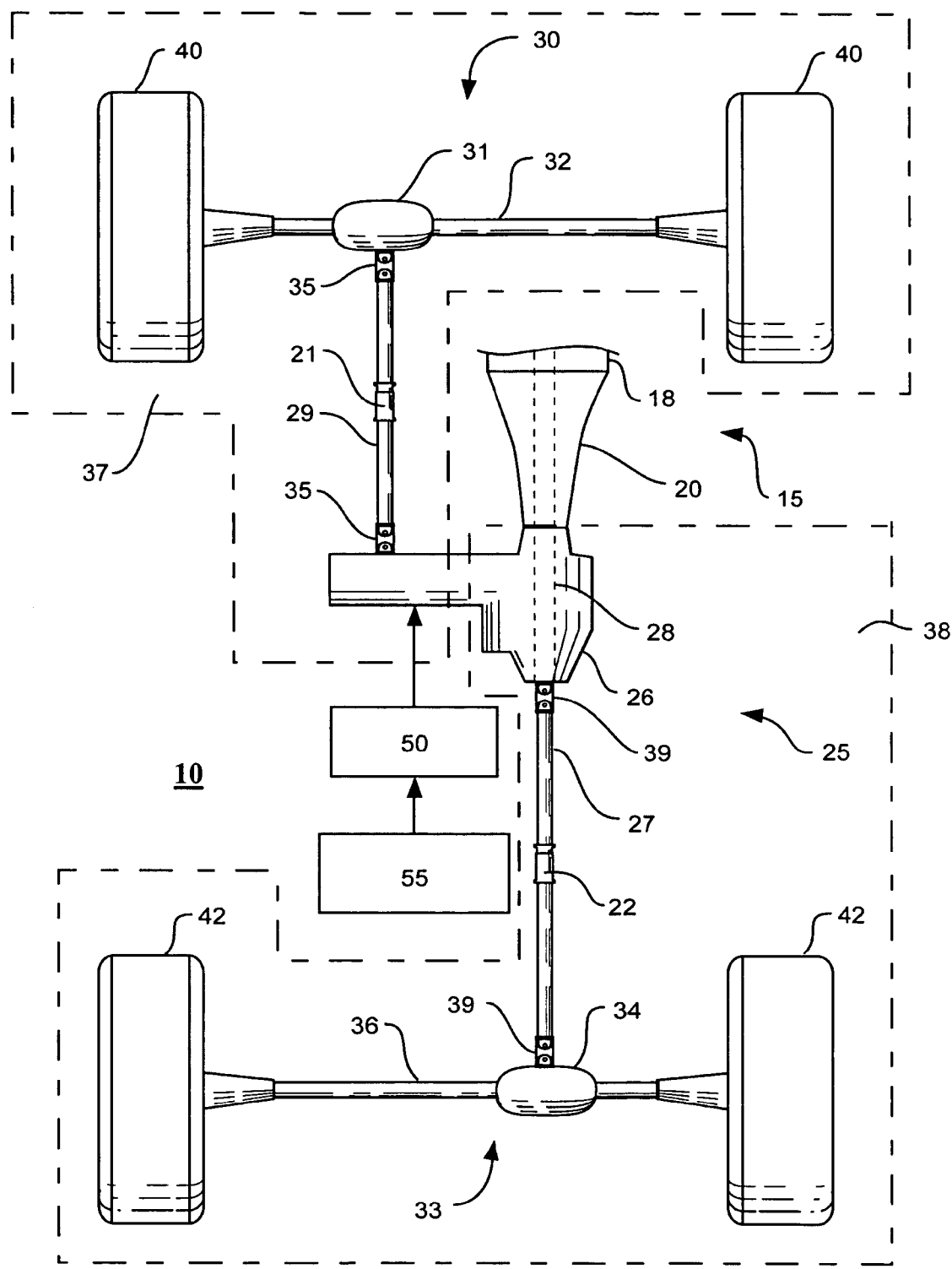
FIG. 1 illustrates a schematic diagram of a system in a four-wheel drive vehicle for reducing backlash.

In the following description, several well-known features of a four-wheel drive vehicle, including features of chain sprockets, are not shown or described so as not to obscure the present invention. FIG. 1 schematically illustrates a power train 15, a drive train 25, a computer 50 and a plurality of sensors 55 within a four-wheel drive vehicle 10. The sensors 55 sense rotational parameters in the various components of the four-wheel drive vehicle 10 and generate sensor signals that are transmitted to the computer 50. The rotational parameters include the rate of rotation and the direction of rotation of rotating components of the four-wheel drive vehicle 10 and the throttle level of the throttle (not shown). The computer 50 receives the sensed rotational parameters, determines a torque reversal from the received parameters and sends command signals to a controller 57 (FIG. 2) in the transfer case 26 in response to the determined torque reversal. A torque reversal occurs when the direction of rotation of a shaft or axle changes or when the meshed gear teeth move in opposite directions over a rotational angle of lash. The computer 50 is typically in the body of the four-wheel drive vehicle 10. In one embodiment, the computer 50 is under a rear seat in the four-wheel drive vehicle 10.

The power train 15 includes an engine 18 that provides torque to a transmission 20, which multiplies the torque and transfers it to a mainshaft 28. The drive train 25 includes the mainshaft 28, a transfer case 26, a rear driveshaft 27, rear driveshaft universal joints 39, a rear slip joint 22, a rear axle assembly 33, a front driveshaft 29, front driveshaft universal joints 35, a front slip joint 21 and a front axle assembly 30.

In one embodiment, the drive train 25 includes the mainshaft 28, a transfer case 26, a rear driveshaft 27, a rear axle assembly 33, a front driveshaft 29, and a front axle assembly 30. In one embodiment, the engine 18 is an electric motor.

The front axle assembly 30 includes a front differential 31 and a pair of front drive wheels 40 connected at opposite ends of a front axle 32. The front driveshaft 29 connects the transfer case 26 to the front differential 31 and includes a front slip joint 21. One of the front driveshaft universal joints 35 is positioned at the interface between the transfer case 26 and the front driveshaft 29 and the other of the front driveshaft universal joints 35 is positioned at the interface between the front axle assembly 30 and the front driveshaft 29.

The rear axle assembly 33 includes the rear differential 34 and a pair of rear drive wheels 42 connected at opposite ends to a rear axle 36. The rear driveshaft 27 includes a rear slip joint 22 and connects the transfer case 26 to the rear differential 34. One of the rear driveshaft universal joints 39 is positioned at the interface between the transfer case 26 and the rear driveshaft 27 and the other of the rear driveshaft universal joints 39 is positioned at the interface between the rear axle assembly 33 and the rear driveshaft 27.

The drive train 25 is separated into a front system 37 and a rear system 38. The front system 37 includes the front axle assembly 30, the front driveshaft 29, the front driveshaft gear set 70 (FIG. 2) in the transfer case 26, the front universal joints 35, and the front slip joint 21. The rear system 38 includes the rear axle assembly 33, the rear driveshaft 27, the rear driveshaft gear set 68 (FIG. 2) in the transfer case 26, the rear universal joints 39, and the rear slip joint 22.

All the mechanical connections include at least one interlocking element with flanges and pins or at least one gear set with intermeshing gear teeth or splines. The front slip joint 21 and front universal joints 35 include an interlocking system of flanges and pins to provide flexibility to the front driveshaft 29. The rear slip joint 22 and the rear universal joints 39 include an interlocking system of flanges and pins to provide flexibility to the rear driveshaft 27. The transfer case 26 is shared by the front system 37 and the rear system 38, and includes an interfacing mechanism to connect or disconnect one of the front driveshaft 29 or the rear driveshaft 27 to or from the mainshaft 28 for on-demand four-wheel drive operation.

Throughout this document, the phrase "four-wheel drive vehicle" refers to both on-demand four-wheel drive vehicles and active full-time four-wheel drive vehicles unless otherwise indicated. An active full-time four-wheel drive vehicle is also referred to as an active all-wheel drive vehicle.

In one embodiment, the vehicle 10 is an on-demand four-wheel drive vehicle 10, which has rear-wheel drive when in the two-wheel mode. In this case, the mainshaft 28 is connected to the rear driveshaft 27. In two-wheel drive mode for a rear-wheel drive vehicle, the mainshaft 28 rotates at the same speed as the rear driveshaft 27 unless the four-wheel drive vehicle 10 is cornering or slipping.

In another embodiment, the four-wheel drive vehicle 10 is an on-demand four-wheel drive vehicle 10, which has front-wheel drive when in the two-wheel mode. In this case, the mainshaft 28 is connected to the front driveshaft 29. In two-wheel drive mode for a front-wheel drive vehicle, the mainshaft 28 rotates at the same speed as the front driveshaft 29 unless the four-wheel drive vehicle 10 is cornering or slipping.

In yet another embodiment, the four-wheel drive vehicle 10 is an active full-time four-wheel drive vehicle. In this case, the mainshaft 28 can be connected to either the front driveshaft 29 or the rear driveshaft 27. The front driveshaft 29, the rear driveshaft 27 and the mainshaft 28 all rotate at the same speed unless the four-wheel drive vehicle 10 is cornering or slipping. An active full-time four-wheel drive vehicle does not operate in two-wheel drive mode but rather operates in a mode of partial disengagement of the clutch pack 60, as known in the art.

Figure 2:
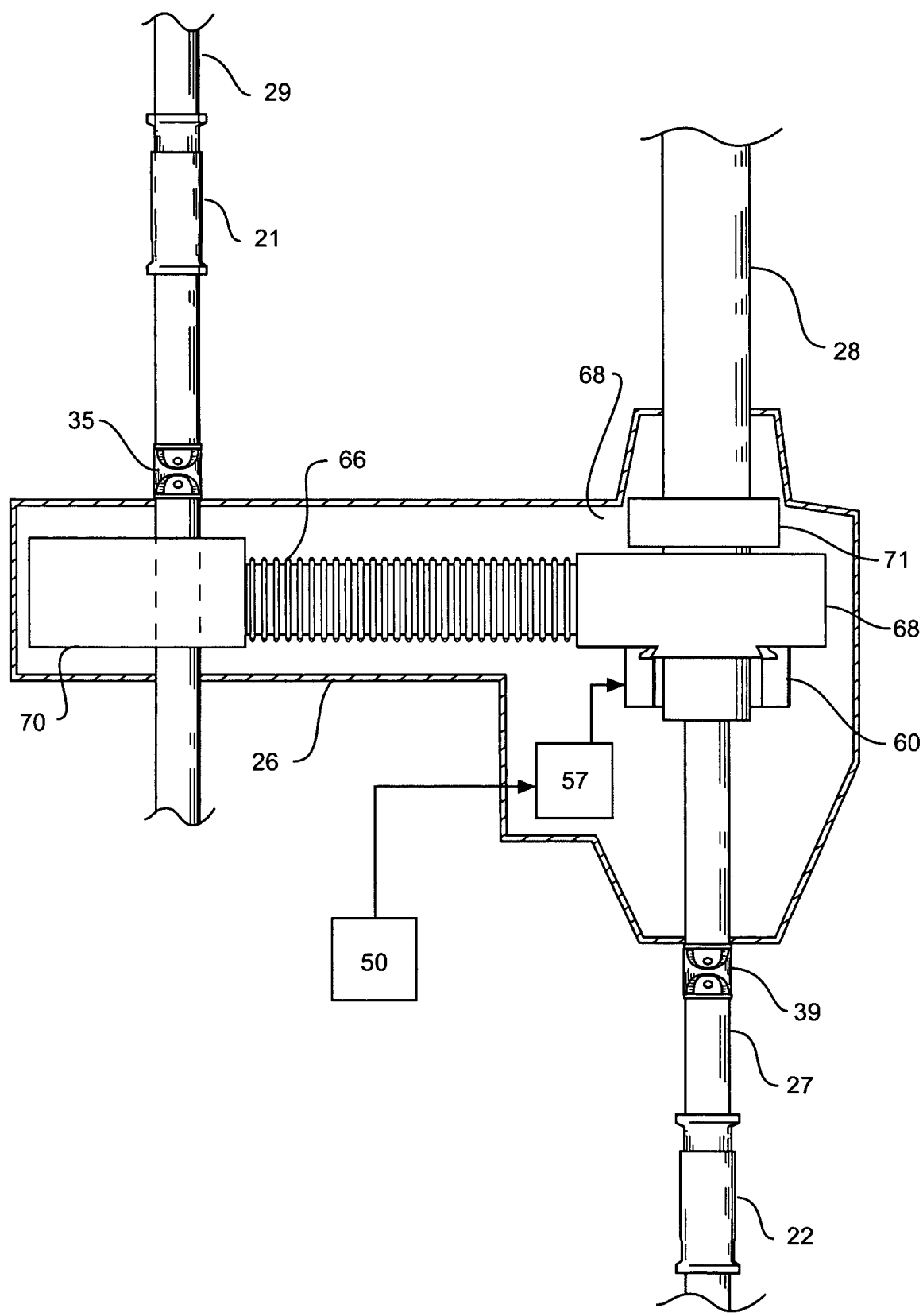
FIG. 2 illustrates a schematic diagram of a transfer case of a four-wheel drive vehicle in a first mode of operation in accordance with an embodiment of the present invention.

FIG. 2 illustrates a schematic diagram of a transfer case 26 of a four-wheel drive vehicle 10 in a first mode of operation in accordance with an embodiment of the present invention. The first mode of operation is two-wheel drive mode for an on-demand four-wheel drive vehicle and a partial disengagement mode for an active full-time four-wheel drive vehicle.

In the first mode of operation, the clutch pack 60 is partially disengaged if the four-wheel drive vehicle 10 is an active full-time four-wheel drive vehicle. In the first mode of operation, the clutch pack 60 is disengaged if the four-wheel drive vehicle 10 is an on-demand four-wheel drive vehicle.

Throughout this document, the phrase "disengaged" refers to both partially disengaged in an active full-time four-wheel drive vehicle and completely disengaged in an on-demand four-wheel drive vehicle. Likewise, the phrase "disengagement" refers to both partial disengagement in an active full-time four-wheel drive vehicle and complete disengagement in an on-demand four-wheel drive vehicle.

The transfer case 26 is in communication with the computer 50. The controller 57 is operable to receive command signals from computer 50. The command signals include instructions to engage or disengage the clutch pack 60. The controller 57 is operably connected to the clutch pack 60 to initiate engagement or disengagement of the clutch pack 60 based on the command signals from the computer 50.

Figure 3:
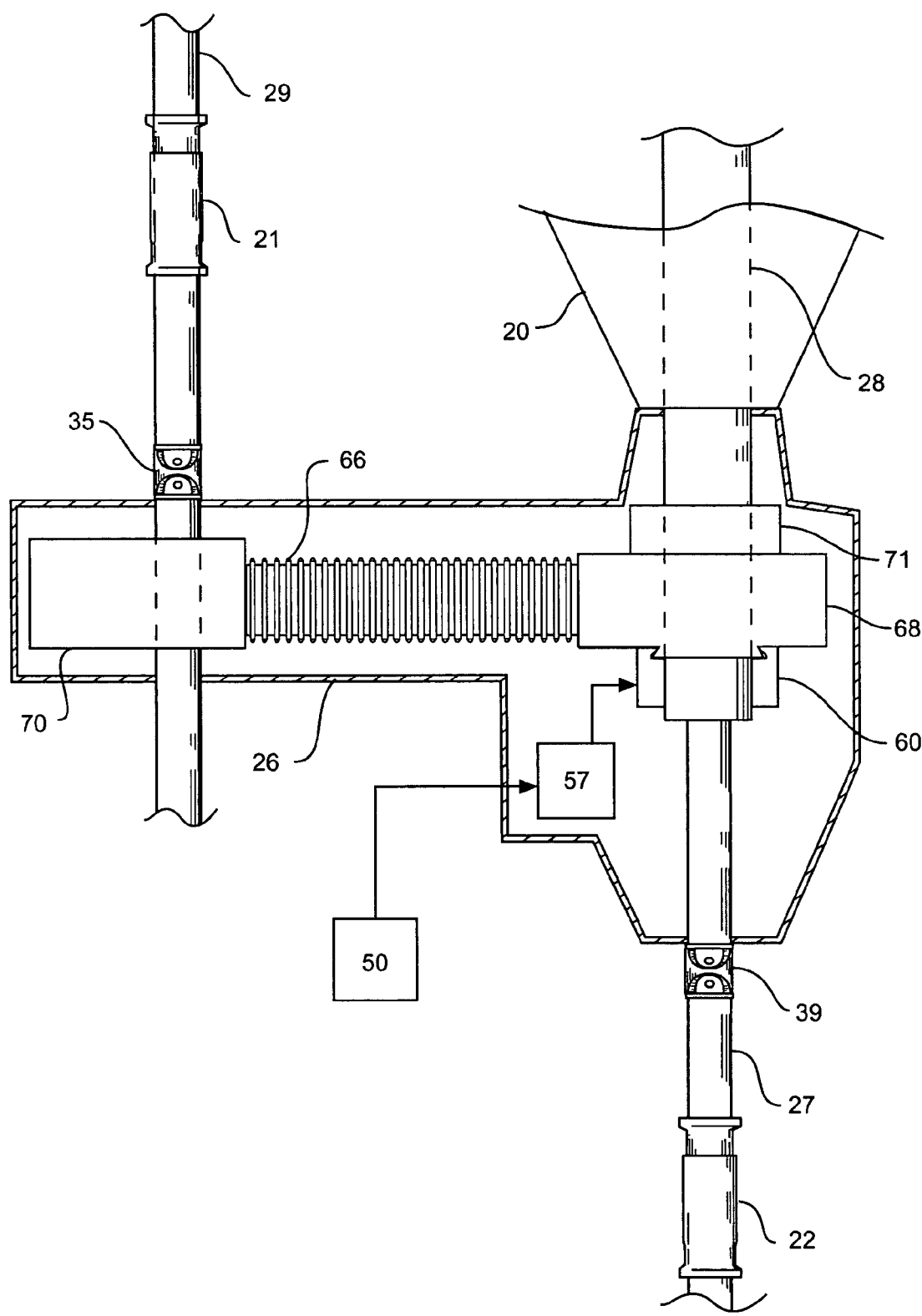
FIG. 3 illustrates a schematic diagram of the transfer case of the four-wheel drive vehicle of FIG. 2 in a second mode of operation in accordance with an embodiment of the present invention.

The engaging/disengaging mechanism of the transfer case 26 includes a rear driveshaft gear set 68, a clutch pack 60, a front driveshaft gear set 70 and a chain 66. If the four-wheel drive vehicle 10 is an active full-time four-wheel drive vehicle, the transfer case 26 also includes a center differential 71, which encircles the mainshaft 28. The center differential 71 is shown in FIGS. 2 and 3 between the rear driveshaft gear set 68 and the transmission 20 (FIG. 1), however the position can vary and is dependent upon the design of the four-wheel drive vehicle 10 and the package of the transfer case 26.

The rear driveshaft gear set 68 includes a drive sprocket (not shown), which encircles the mainshaft 28. The rear driveshaft gear set 68 also includes other gear sets and linking interfaces between the mainshaft 28, the rear driveshaft 27, and the chain 66 that each contribute to the backlash when the torque of the rear driveshaft 27 or mainshaft 28 changes. The rear universal joints 39 and the rear slip joint 22 contribute to the backlash when the torque of rear axle assembly 33 changes. The backlash due to torque changes in the rear system 38 is generated at one or more of the interfaces in the rear system 38.

The front driveshaft gear set 70 includes a drive sprocket (not shown), which encircles and is attached to the front driveshaft 29. The front driveshaft gear set 70 also includes other gear sets and linking interfaces between the front driveshaft 29 and the chain 66 that each contribute to the backlash when the torque of the front driveshaft 29 changes. The front universal joints 35 and the front slip joint 21 contribute to the backlash when the torque of front axle system 30 changes. The backlash due to torque changes in the front system 37 is generated at one or more of the interfaces in the front system 37.

A backlash event occurs when at least one intermeshed tooth in a gear set impacts an adjacent tooth in the gear set. The impact results when the angular velocity of one set of teeth in the gear set is changed with respect to angular velocity of the intermeshed set of teeth in the gear set. Likewise, a backlash event occurs when at least one pair of intermeshed flanges in an interface impact each other due to a relative change in angular velocity.

The timing differences between backlash events in a drive train 25 can be caused in two ways. First, a time for teeth in a gear set to traverse the lash in the gear set is calculable from the specified lash between the meshed teeth and the measured difference in rotational velocity of the meshed teeth. Such a lash-based backlash event occurs after a passage of a lash-based backlash time. The lash-based backlash time is the time it takes for a tooth to rotate through the lash at a given angular velocity. The lash-based backlash time is a range of times since there is variation in the lash that is specified for each gear set. The lash between components in and interfacing with the various axles and shafts is typically specified as the angle subtended between facing surfaces on adjacent intermeshed teeth or flanges. In one embodiment, the front axle 32 has lash in the range of 2° to 6°, the rear axle 36 has lash in the range of 3° to 7°, the front driveshaft 29 and rear driveshaft 27 have lash of less than 1°, and the transfer case 26 has lash in the range of 2° to 6°.

Second, it takes time to transfer a change in angular velocity through a series of interconnected gear sets. A series of lash-based backlash events occur sequentially at the mechanically interconnected gear sets, each with their own lash-based backlash times. The transfer is initiated at an initial gear set, for example, a front axle 32, and is completed at the final gear set, for example, a gear set in the transfer case 26 mechanically linked to the chain 66. This transfer time is called a transfer-based backlash time and it is the sum of the lash-based backlash times for each interconnected gear set between the initial gear set and the final gear set. The transfer-based backlash time is a range of times. The backlash resulting from the transfer is called a transfer-based backlash event.

In most cases, the occupants of the four-wheel drive vehicle 10 cannot distinguish the separate lash-based backlash events, since they are so closely spaced in time. When the torque changes, the front system 37 and the rear system 38 can have different transfer-based backlash times. Unless otherwise noted, a backlash event described herein refers to a combined backlash of lash-based and transfer-based backlash events.

The chain 66 is connected to the rear driveshaft gear set 68 and the front driveshaft gear set 70 via sprockets (not shown). When the clutch pack 60 of an on-demand four-wheel drive vehicle is disengaged in the first mode of operation, the chain 66 is not operably connecting the rear driveshaft gear set 68 to the front driveshaft gear set 70. Thus, the chain 66 does not transfer the angular velocity of the mainshaft 28 to the front driveshaft 29 of a rear wheel drive on-demand four wheel drive vehicle. Likewise, when the clutch pack 60 of an active full-time four-wheel drive vehicle is partially disengaged in the first mode of operation, the chain 66 is loosely connecting the rear driveshaft gear set 68 to the front driveshaft gear set 70. Thus, the chain 66 does not efficiently and/or immediately transfer the angular velocity of the mainshaft 28 to the front driveshaft 29.

In one embodiment, the chain 66 is operably connected to the rear driveshaft gear set 68 and is moving with an angular velocity correlated to the angular velocity of the rear driveshaft 27, but the angular velocity is not transferred to the front driveshaft gear set 70. In another embodiment, the chain 66 is operably connected to the front driveshaft gear set 70 and is moving with an angular velocity correlated to the angular velocity of the front driveshaft 29, but the angular velocity is not transferred to the rear driveshaft gear set 68. In yet another embodiment, the chain 66 is not operably connected to either the front driveshaft gear set 70 or the rear driveshaft gear set 68.

When the driver of a four-wheel drive vehicle 10 shifts gears, accelerates or decelerates, the torque in the various shafts and axles changes and in some cases the torque changes are torque reversals. In one embodiment, the automatic transmission 20 shifts the gears.

The torque reversal is sensed due, for example, to the following changes: a gear change from neutral to reverse; a gear change from neutral to drive; a gear change from neutral to park; a gear change from reverse to neutral; a gear change from reverse to drive; a gear change from reverse to park; a gear change from drive to neutral; a gear change from drive to reverse; a gear change from drive to park; a gear change from park to neutral; a gear change from park to reverse; a gear change from park to drive; a throttle change from no applied throttle to application of throttle; a throttle change from application of throttle to no applied throttle; a throttle change from a first level of applied throttle to a second level of applied throttle; an engine torque change; a throttle position change; and combinations of these changes.

The backlash due to torque reversal in the front driveshaft 29 can be different from the backlash due to torque reversal in the rear driveshaft 27 when the four-wheel drive vehicle 10 is operated in the first mode of operation. The backlash in the rear driveshaft gear set 68 can be greater than the backlash in the front driveshaft gear set 70. Alternatively, the backlash in the front driveshaft gear set 70 can be greater than the backlash in the rear driveshaft gear set 68. Differences in the backlash between the front driveshaft 29 and rear driveshaft 27 is due to differences in the starting angular velocity of the front driveshaft 29 and the starting angular velocity of the rear driveshaft 27. Additionally, differences in the backlash between the front driveshaft 29 and rear driveshaft 27 is due to differences in the lash between the gear teeth of the front system 37 and the rear system 38, respectively.

FIG. 3 illustrates a schematic diagram of the transfer case 26 of the four-wheel drive vehicle 10 of FIG. 2 in a second mode of operation in accordance with an embodiment of the present invention. The second mode of operation is four-wheel drive mode for an on-demand four-wheel drive vehicle and a full engagement mode for an active full-time four-wheel drive vehicle.

The rear driveshaft 27 is fully engaged with the front driveshaft 29 in the second mode of operation. The transfer case 26 is in communication with computer 50 and the controller 57 is operable to receive command signals from computer 50. The transfer case 26 was described above with reference to FIG. 2. When the clutch pack 60 is engaged, the chain 66 operably connects the rear driveshaft gear set 68 with the front driveshaft gear set 70. Thus, the engagement of the clutch pack 60 is operable to mechanically connect the rear driveshaft 27 to the front driveshaft 29 so that the rear driveshaft 27 and the front driveshaft 29 rotate at the same speed.

Figure 4:
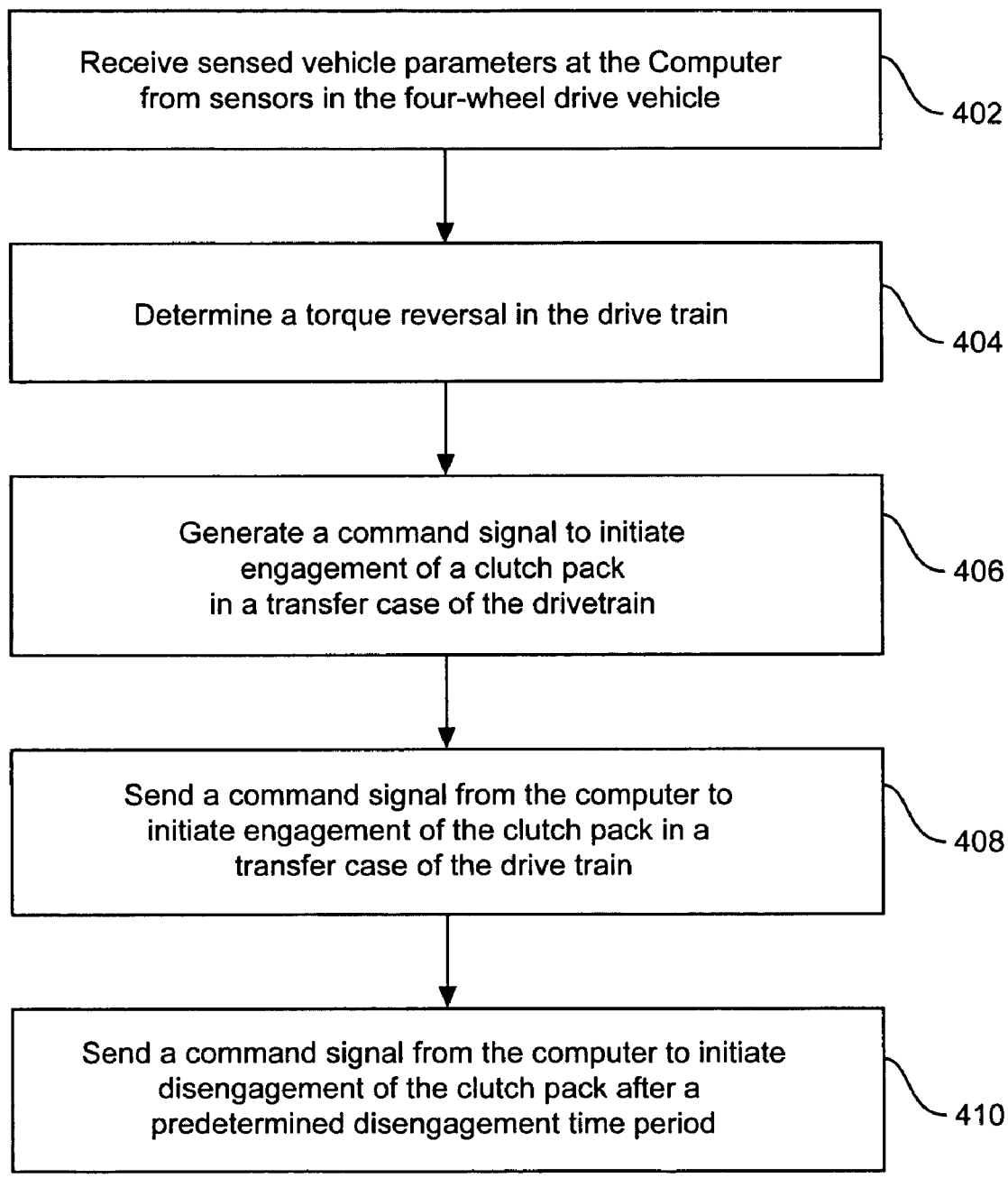
FIG. 4 illustrates a method of reducing backlash in a four-wheel drive vehicle in accordance with the present invention.

In FIG. 4, the methodology of reducing backlash in a four-wheel drive vehicle 10 of the present invention is illustrated in flowchart form as method 400. One or more of the computer 50, the controller 57, and the sensors 55 have stored in computer readable medium at least one computer program including computer readable code to perform the operations described with reference to method 400. The method 400 is applicable to reducing backlash in both lash-based backlash events and transfer-based backlash events when the four-wheel drive vehicle 10 is driven in the first mode of operation.

At block 402, the computer 50 receives sensed rotational parameters from sensors 55 in the power train 15 and the drive train 25 of the four-wheel drive vehicle 10. In one embodiment, the sensed rotational parameters received at the computer 50 from sensors 55 include an engine torque value from a sensor in the engine and throttle position value from a throttle sensor or a throttle position sensor.

In one embodiment, the torque reversal is calculated by the computer 50 based on receiving rotational parameters from one sensor 55. In another embodiment, the torque reversal in the drive train 25 is calculated by the computer 50 based on the input from at least two sensors 55 at two separate locations on the four-wheel drive vehicle 10.

Many sensor locations can be selected for the placement of the sensors including one or more of the following locations: a transfer case chain to a front driveshaft gear set location; a transfer case chain to a rear driveshaft gear set location; a transfer case chain to a front sprocket location; a transfer case chain to a rear sprocket location; a front sprocket to front driveshaft location; a rear sprocket to rear driveshaft location; a front driveshaft universal joint location; a rear driveshaft universal joint location; a front axle differential gear set to front driveshaft location; a rear axle differential gear set to rear driveshaft location; a front wheel to front axle location; and a rear wheel to rear axle location.

In one embodiment, the sensor signals are continuously sent to the computer 50. In another embodiment, the sensor signals are periodically sent to the computer 50. The sensor signals generated by the plurality of sensors 55 are transmitted to the computer 50 via a network or data bus in the four-wheel drive vehicle 10.

In one embodiment, sensor 55 is positioned at or near one of the axles or driveshafts to sense the rotational parameters and to transmit sensor signals indicative of the sensed vehicle parameters to the computer 50. In another embodiment, at least one sensor 55 is positioned at or near the front axle 32 or the front driveshaft 29. In yet another embodiment, at least one sensor 55 is positioned at or near one of the rear axle 36 or the rear driveshaft 27 in the four-wheel drive vehicle 10 to sense the rotational parameters and to transmit sensor signals indicative of the sensed vehicle parameters to the computer 50.

In yet another embodiment, at least one sensor 55 is positioned at or near the front axle 32 or the front driveshaft 29 and at least one other sensor 55 is positioned at or near one of the rear axle 36 or the rear driveshaft 27 in the four-wheel drive vehicle 10 to sense the rotational parameters and to transmit sensor signals indicative of the sensed vehicle parameters to the computer 50.

In one embodiment the torque sensors include speed sensors on each wheel end or on each axle connected to the transfer case 26. The speed sensors are operable to sense the rotational speed of portions of the power train 15, such as the engine crankshaft (not shown). Rotation sensors also sense the rotational speed of portions of the drive train 25, such as one or more of the mainshaft 28, the pair of front drive wheels 40, the front axle 32, the front driveshaft 29, the pair of rear drive wheels 42, the rear axle 36, and/or the rear driveshaft 27. The direction of the rotation must be included in the rotational parameter.

Additionally, the computer 50 receives input from mode sensors about the mode of operation of the four-wheel drive vehicle 10. Mode sensors measure the position of the clutch pack 60 to sense the mode of operation of the four-wheel drive vehicle 10. The mode of operation includes the first mode of operation and the second mode of operation, as defined above with reference to FIGS. 2 and 3.

At block 404, the computer 50 determines a torque reversal in the front drive train 29 and/or the rear drive train 27 based on the received rotational parameters by applying one or more algorithms stored in a memory (not shown) of the computer 50 to the sensed rotational parameters received at block 402. A torque reversal is a change in the angular velocity of an axle or driveshaft that results in a lash-based backlash event as defined above with reference to FIG. 2. In one embodiment, the computer 50 applies an algorithm to the sensed engine torque to calculate a driveline torque at the transfer case 26. The driveline torque at the transfer case 26 is the torque at the front driveshaft 29, the rear driveshaft 27, and/or the mainshaft 28. The computer 50 compares the calculated driveline torque at the transfer case 26 to a threshold driveline torque. If the calculated driveline torque at the transfer case 26 exceeds the threshold driveline torque value, the computer 50 determines a torque reversal. The threshold driveline torque value is stored in a memory (not shown) of the computer 50.

In another embodiment, the computer algorithm determines a torque reversal when the engine torque reaches a reference engine torque and a throttle position reaches a reference throttle position. The reference engine torque and the reference throttle position are stored in a memory of the computer 50 and the algorithm compares the sensed engine torque and throttle position with the reference engine torque and the reference throttle position. In one embodiment, the computer algorithm determines a torque reversal when the engine torque exceeds or reaches a reference engine torque and a throttle position exceeds or reaches a reference throttle position.

In another embodiment, the computer algorithm compares the rotational values over time for various mechanically linked shafts and/or axles in the four-wheel drive vehicle 10. Specifically, the computer algorithm is applied to the received rotational values to calculate an angular acceleration or rate-of-change of the angular velocity over a preset interval of time for the axle, driveshaft, or gear set. The rate-of-change of the angular velocity includes a difference in angular rotation value and indicates if there is a change in the direction of rotation of the axle or driveshaft, or gear set. The preset interval of time is stored in a memory of the computer 50. The preset interval of time is set based on the specifications of the drive train 25 of a four-wheel drive vehicle 10.

If an axle, driveshaft or gear set in front system 37 changes angular velocity by a first amount, while an axle, driveshaft or gear set in rear system 38 changes angular velocity by a second amount, then the computer 50 calculates a lash-based backlash event and a lash-based backlash time, as defined above with reference to FIG. 2 for the front system 37 and the rear system 38.

The computer 50 subtracts the lash-based backlash time for the front system 37 from the lash-based backlash time for the rear system 38. The computer then compares the difference with a maximum acceptable time difference. The maximum acceptable time difference is stored in a memory (not shown) of the computer 50. If the calculated difference in lash-based backlash time for the front system 37 and the rear system 38 is greater than the maximum acceptable time difference, then the computer 50 determines a torque reversal in the drive train 25. The maximum acceptable time difference is based on the design of the four-wheel drive vehicle 10.

The computer 50 obtains the mode of operation of the four-wheel drive vehicle 10 from a mode sensor to determine the mode of operation of the four-wheel drive vehicle 10.

At block 406, the computer 50 generates a command signal to initiate engagement of the clutch pack 60 based on the torque reversal determined at block 404 and a determination that four-wheel drive vehicle 10 is in the first mode of operation. If the four-wheel drive vehicle 10 is in the second mode of operation, the difference between the lash-based backlash time for the front system 37 and the lash-based backlash time for the rear system 38 is negligible, since the front system 37 is connected to the rear system 38 at the transfer case 26 in the second mode of operation.

At block 408, the computer 50 sends the generated command signal to initiate engagement of the clutch pack 60 in the transfer case 26 of drive train 25. The command signal is sent from the computer 50 via a network or data bus in the four-wheel drive vehicle 10 to the controller 57. The controller 57, in response to receiving the command signal, provides an electrical and/or mechanical signal to the clutch pack 60 to engage. The clutch pack 60 receives the electrical and/or mechanical signal and attaches to the chain 66 via the rear driveshaft gear set 68. The front driveshaft 29 is connected to the rear driveshaft 27 when the clutch pack 60 is engaged. The backlash is limited to the backlash generated in the front system 37 or rear system 38, whichever occurs first.

When the front driveshaft 29 is connected to the rear driveshaft 27 by the clutch pack 60 before the transfer-based backlash time elapses, the total backlash is reduced to the lash-based backlash in the final gear set interface.

In one embodiment, the backlash of the series of lash-based backlash events that occur sequentially at the mechanically interconnected gear sets are also included in the total backlash experienced by the occupants of the four-wheel drive vehicle. In this embodiment, the backlash is reduced to the backlash that occurs before the front driveshaft 29 is connected to the rear driveshaft 27 by the clutch pack 60.

In another embodiment, the angular velocity difference is only sensed in the final gear interfaces for the front system 37 and the rear system 38. The final gear interfaces are in the transfer case 26 and are mechanically connected to the chain 66. In this embodiment, the computer 50 determines a torque reversal that is based on a calculated lash-based backlash event at the final gear interface. The locking of the front driveshaft 29 to the rear driveshaft 27, in this case, limits the backlash to the amount of backlash in the final gear set that has the lesser amount of angular rotation to travel before impact between the meshed teeth of the interfacing gear set. No transfer-based backlash time elapses in this embodiment.

The clutch pack 60 is in the mode illustrated in FIG. 2, before the clutch pack 60 is engaged. The clutch pack 60 is in the mode illustrated in FIG. 3, after the clutch pack 60 is engaged.

In an embodiment in which the sensor signals are periodically sent to the computer 50, the preset interval of time must be small enough for the torque reversal to be recognized in time to initiate engagement of the clutch pack 60 before the driver senses the backlash, which is correlated to the torque reversal.

At block 410, the computer 50 sends a command signal to controller 57 within the transfer case 26 to initiate disengagement of the clutch pack 60 after a predetermined disengagement time period. The computer 50 initiates a clock when the command signal to initiate the engagement of the clutch pack 60 is sent at block 408. When the clock reaches the predetermined disengagement time period, the computer 50 sends the command signal to controller 57 to disengage the clutch pack 60.

The controller 57, in response to receiving the command signal, provides the electrical and/or mechanical signals to the clutch pack 60 to disengage so that the front driveshaft 29 is disengaged from the mainshaft 28 and rear driveshaft 27.

In one embodiment, the computer 50 sets the longer transfer-based backlash time to be the predetermined disengagement time. In this embodiment, the command signal to disengage the clutch pack 60 is sent after the longer transfer-based backlash time elapses.

In an embodiment in which the angular velocity difference is only sensed in the final gear interfaces for the front system 37 and the rear system 38, the longer of the lash-based backlash times elapses before the computer 50 sends a command signal to controller 57 within the transfer case 26 to initiate disengagement of the clutch pack 60. In this embodiment, the computer 50 sets the longer of the lash-based backlash time to be the predetermined disengagement time.

In one embodiment, the predetermined disengagement time period is within a range of 2 to 10 seconds and is stored in a memory of the computer 50. In another embodiment, the predetermined disengagement time period is within a range of 1 to 13 seconds and is stored in a memory of the computer 50. In this embodiment, the predetermined disengagement time period is based on the design of the four-wheel drive vehicle 10. The specifications for lash and lash-variation between the meshed teeth in all the gear sets interfaces in the four-wheel drive vehicle are known. The computer 50 is programmed with a predetermined disengagement time equal to or exceeding the longest time required for the backlash to be transferred through all the interconnecting interfaces.

Figure 5:
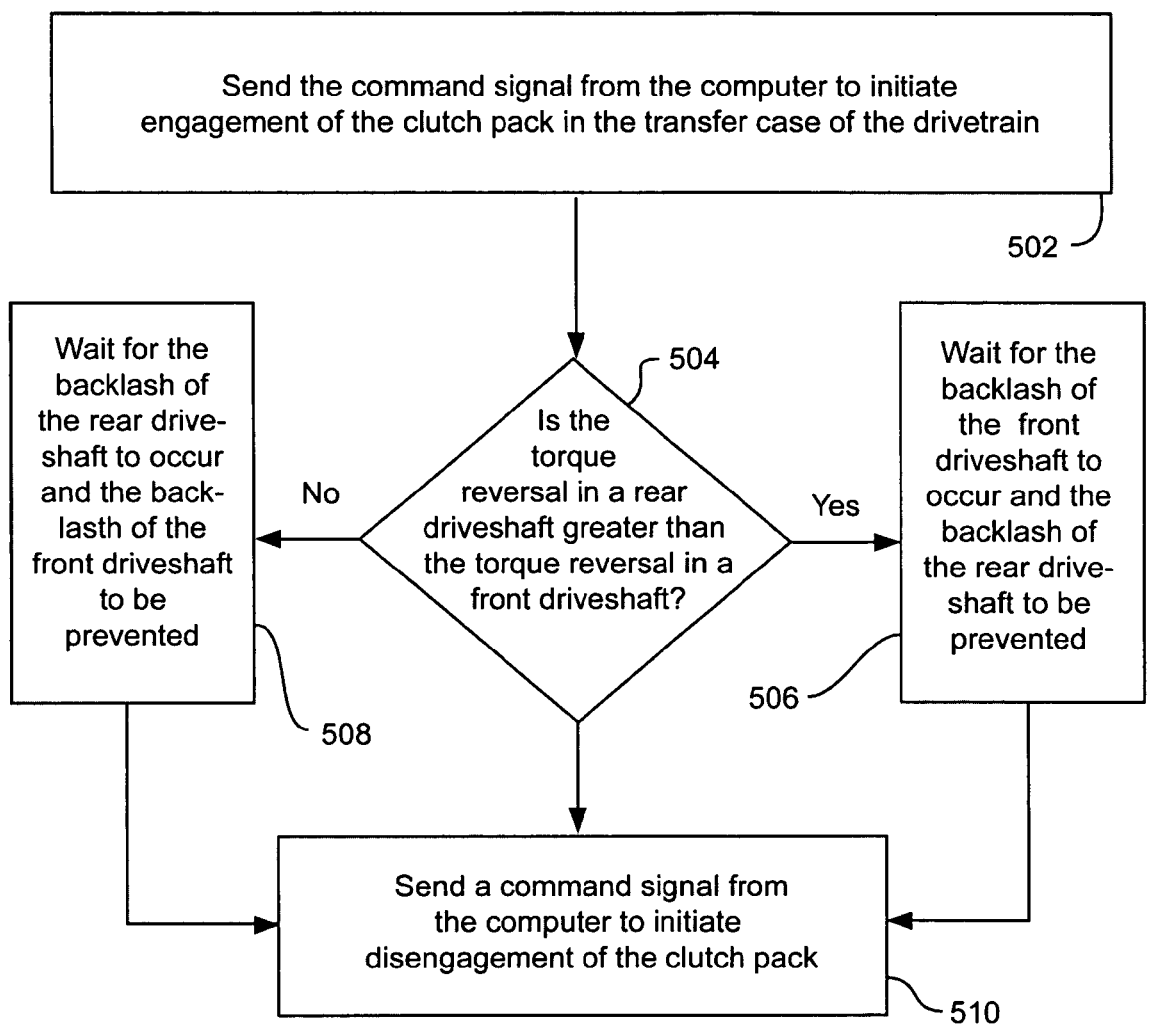
FIG. 5 illustrates a method of sending a disengagement command signal after a predetermined disengagement time period in accordance with one step of the method illustrated in FIG. 4.

FIG. 5 illustrates a method 500 of sending a command signal to controller 57 within the transfer case 26 to initiate disengagement of the clutch pack 60 after a predetermined disengagement time period. One or more of the computer 50, the controller 57, and the sensors 55 have stored in computer readable medium at least one computer program including computer readable code to perform the operations described with reference to method 500. Method 500 is applicable in the embodiment in which the transfer-based backlash time in the front system 37 is different from the transfer-based backlash time in the rear system 38. The transfer-based backlash time in the front system 37 is called the front transfer-based backlash time. Likewise, the transfer-based backlash time in the rear system 38 is called the rear transfer-based backlash time.

At block 502, the computer 50 sends a command signal to controller 57 within the transfer case 26 to initiate engagement of the clutch pack in the transfer case 26 of the drive train 25 as described above with reference to block 408 of method 400 in FIG. 4. When the command signal is sent at block 502, the computer 50 sets a clock (not shown) to zero. In one embodiment, the clock is set to zero when the torque reversal is sensed as described above with reference to block 402 of method 400 in FIG. 4.

At block 504, the computer 50 determines if the torque reversal in the rear driveshaft 27 is greater than the torque reversal in the front driveshaft 29. The torque reversal in the rear driveshaft 27 is greater than the torque reversal in the front driveshaft 29, if the transfer-based backlash time in the rear system 38 is greater than the transfer-based backlash time in the front system 37. If the rear transfer-based backlash time is greater than the front transfer-based backlash time the flow proceeds to block 506. The longer transfer-based backlash time is stored in a memory of the computer 50.

At block 506, the computer 50 waits for the backlash of the front driveshaft 29 to occur and the backlash of the rear driveshaft 27 to be prevented. The computer 50 periodically compares the clock time to the stored rear transfer-based backlash time until the clock, which was set to zero at block 502, reaches a time equal to the rear transfer-based backlash time. When the clock reaches a time equal to the rear transfer-based backlash time, the backlash of the front driveshaft 29 has occurred and the backlash of the rear driveshaft 27 was prevented. The flow proceeds to block 510.

If at block 504, the computer 50 determines the front transfer-based backlash time is greater than the rear transfer-based backlash time, the flow proceeds to block 508. At block 508, the computer 50 waits for the backlash of the rear driveshaft 27 to occur and the backlash of the front driveshaft 29 to be prevented. The computer 50 periodically compares the clock time to the stored front transfer-based backlash time until the clock reaches a time equal to the front transfer-based backlash time. When the clock reaches a time equal to the front transfer-based backlash time the backlash of the rear driveshaft 27 has occurred and the backlash of the front driveshaft 29 was prevented. The flow proceeds to block 510.

At block 510, the computer 50 sends a command signal to initiate disengagement of the clutch pack 60. The driver of the four-wheel drive vehicle 10 has experienced a reduced backlash and the four-wheel drive vehicle 10 is returned to the first mode of operation until the next time the computer 50 determines a torque reversal in the drive train 25.

In the embodiments described herein, occupants of the four-wheel drive vehicle 10 experience a reduced amount of backlash or clunk when the torque changes between the front system 37 and the rear system 38 differ. The extent in time and, thus the intensity, of a backlash event is minimized by this method and system so the occupants experience a more comfortable ride.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A method to reduce backlash in a drive train of a four-wheel drive vehicle, the method comprising:
    receiving rotational parameters from sensors in the four-wheel drive vehicle;
    determining a torque reversal in the drive train based on the received rotational parameters; and
    sending a command signal to initiate engagement of a clutch pack in a transfer case of the drive train responsive to the determination;
    wherein when the torque reversal is greater in one of the front driveshaft of the drive train relative to the rear driveshaft of the drive train, or the rear driveshaft of the drive train relative to the front driveshaft of the drive train, the clutch pack engagement reduces the backlash in the drive train to backlash of the driveshaft with the smaller backlash.

2. The method of claim 1, further comprising:
    sending a command signal to initiate disengagement of the clutch pack after a predetermined disengagement time period.

3. The method of claim 2, wherein the disengagement time period is within a range of 2 to 10 seconds.

4. The method of claim 1, wherein the torque reversal is sensed due to a change selected from the group consisting of a gear change from neutral to reverse, a gear change from neutral to drive, a gear change from neutral to park, a gear change from reverse to neutral, a gear change from reverse to drive, a gear change from reverse to park, a gear change from drive to neutral, a gear change from drive to reverse, a gear change from drive to park, a gear change from park to neutral, a gear change from park to reverse, a gear change from park to drive, a throttle change from no applied throttle to application of throttle, a throttle change from application of throttle to no applied throttle, a throttle change from a first level of applied throttle to a second level of applied throttle, an engine torque change, a throttle position change, and combinations thereof.

5. The method of claim 1, wherein the front driveshaft is mechanically connected to the rear driveshaft when the clutch pack is engaged.

6. The method of claim 1, wherein when the torque reversal is greater in the front driveshaft of the drive train than in the rear driveshaft of the drive train the front driveshaft is connected to the rear driveshaft by the clutch pack before the backlash of the rear driveshaft occurs.

7. The method of claim 6, further comprising
    sending a command signal to initiate disengagement of the clutch pack after the backlash of the rear driveshaft occurs and after the backlash of the front driveshaft is prevented.

8. The method of claim 1, wherein the front driveshaft is connected to the rear driveshaft when the clutch pack is engaged.

9. The method of claim 1 wherein when the torque reversal is greater in the rear driveshaft of the drive train than in the front driveshaft of the drive train the front driveshaft is connected to the rear driveshaft by the clutch pack before the backlash of the front driveshaft occurs.

10. The method of claim 9, further comprising sending a command signal to initiate disengagement of the clutch pack after the backlash of the front driveshaft occurs and after the backlash of the rear driveshaft is prevented.

11. The method of claim 1, wherein the torque reversal in the drive train is sensed by at least two sensors.

12. A computer readable medium storing a computer program comprising:
   computer readable code for receiving rotational parameters from sensors in a four-wheel drive vehicle;
   computer readable code for determining a torque reversal in a drive train of the four-wheel drive vehicle based on the received rotational parameters; and
   computer readable code for sending a command signal to initiate engagement of a clutch pack in a transfer case of the drive train responsive to the determination;
   wherein the computer readable code determines the torque reversal is greater in one of the front driveshaft of the drive train relative to the rear driveshaft of the drive train, or the rear driveshaft of the drive train relative to the front driveshaft of the drive train, and
   wherein the clutch pack engagement is responsive to the torque reversal determination to reduce backlash in the drive train to backlash of the driveshaft with the smaller backlash.

13. The medium of claim 12, further comprising:
   computer readable code for sending a command signal to initiate disengagement of the clutch pack after a predetermined disengagement time period.

14. The medium of claim 13, wherein the predetermined disengagement time period is within a range of 2 to 10 seconds.

15. The medium of claim 12, wherein when the computer readable code determines the torque reversal is greater in the front driveshaft of the drive train to the rear driveshaft of the drive train,
   the medium further comprises computer readable code for sending a command signal to initiate the disengagement of the clutch pack after the backlash of the rear driveshaft occurs and after the backlash of the front driveshaft is prevented.

16. The medium of claim 12, wherein when the computer readable code determines the torque reversal is greater in the rear driveshaft of the drive train relative to the front driveshaft of the drive train,
   the medium further comprises computer readable code for sending a command signal to initiate the disengagement of the clutch pack after the backlash of the front driveshaft occurs and after the backlash of the rear driveshaft is prevented.

* * * * *

UNITED STATES PATENT AND TRADEMARK OFFICE
CERTIFICATE OF CORRECTION

PATENT NO. : 7,341,541 B2  Page 1 of 1
APPLICATION NO. : 11/247801
DATED : March 11, 2008
INVENTOR(S) : Houtman et al.

It is certified that error appears in the above-identified patent and that said Letters Patent is hereby corrected as shown below:

<u>Title Page</u>:
Item (75) Inventors:

Inventor "Jeffrey D. Foor, Plymouth, MI (US)"
should read -- Jeffery D. Foor, Plymouth, MI (US) --

Signed and Sealed this

Thirtieth Day of September, 2008

JON W. DUDAS
*Director of the United States Patent and Trademark Office*